May 9, 1967 R. E. MEYER 3,317,971
ROPE SAFETY CLAMP DEVICE
Filed Feb. 23, 1965
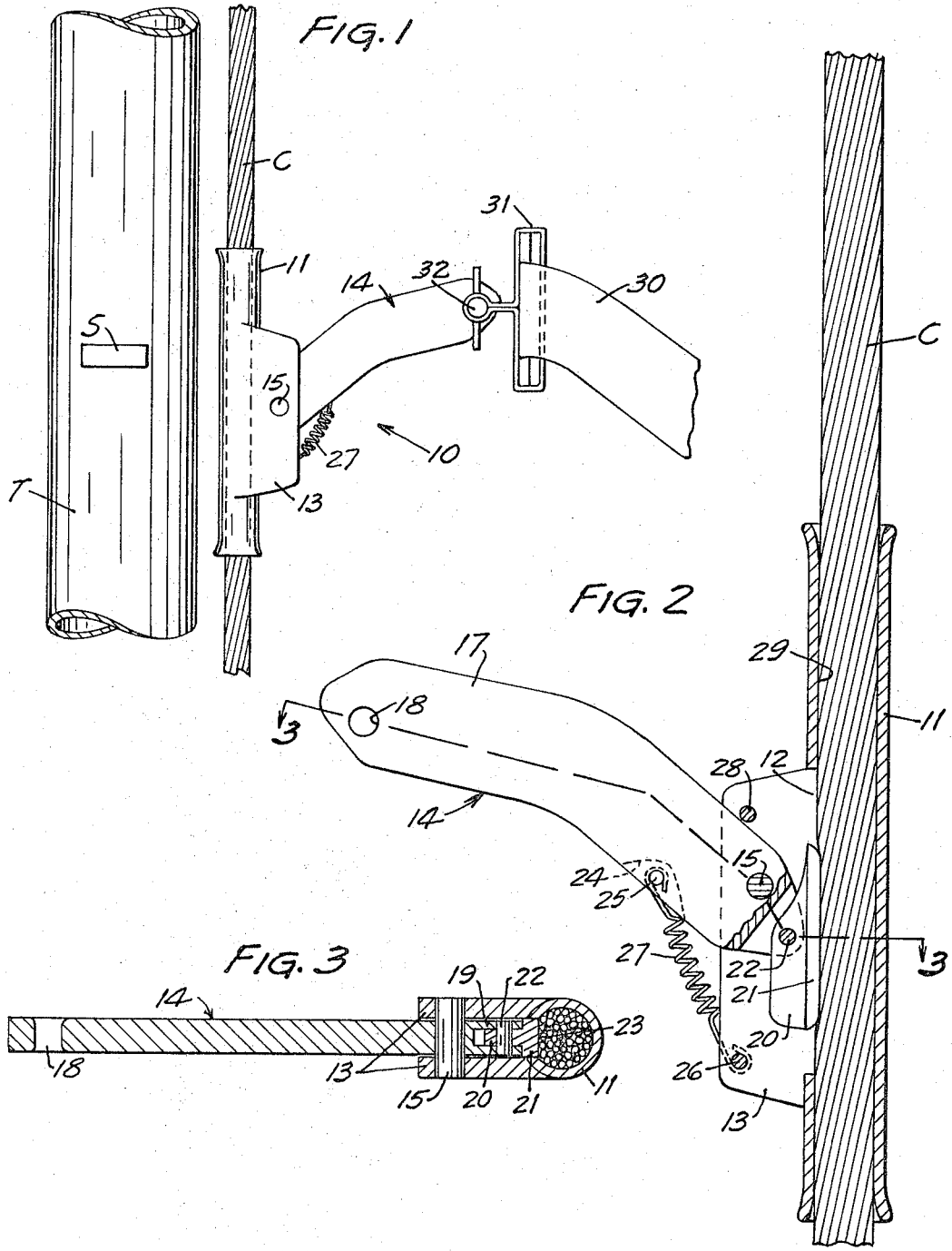
INVENTOR
ROY E. MEYER
BY
Williamson & Palmatier
ATTORNEYS

ES PATENT OFFICE 3,317,971
Patented May 9, 1967

3,317,971
ROPE SAFETY CLAMP DEVICE
Roy E. Meyer, Red Wing, Minn. 55066
Filed Feb. 23, 1965, Ser. No. 434,518
4 Claims. (Cl. 24—134)

This invention relates to a cable clamping safety device of the type which is connectible to a workman's safety belt.

An object of this invention is to provide a novel cable clamping safety device which is connectible to a safety applicance such as a workmen's safety belt, and which will effectively clamp the cable in the event that a workman loses his footing, but which will slide freely down the cable during normal descent of the workman.

A more specific object of this invention is to provide a novel and improved cable clamping safety device including a tubular body movable along a vertically oriented safety cable, and having a cable clamping friction shoe actuated by an operating member that is connected to the workman's safety belt, the safety device being arranged and constructed so that the action of gravity exerted thereon slightly exceeds the friction between the cable and cable engaging surfaces of the device, thereby allowing the safety device to freely slide downwardly as the workman descends and thereby free the hands of the workman for other tasks.

A further object of this invention is to provide a novel cable clamping safety device which is adaptable for use with both metallic and non-metallic safety cables, including nylon cables or the like, even though such plastic cables have a relatively low coefficient of friction with respect to the metallic cable engaging elements of the safety device.

These and other objects and advantages of the invention will more fully appear from the following description made in connection with the accompanying drawings, wherein like character references refer to the same or similar parts throughout the several views, and in which:

FIG. 1 is a side elevational view of the cable clamping safety device applied to a safety cable and interconnected to a workman's safety belt.

FIG. 2 is a vertical longitudinal sectional view of the device on a large scale, and FIG. 3 is a detail sectional view taken approximately along line 3—3 of FIG. 2 and looking in the direction of the arrows.

Referring now to the drawings, and more specifically to FIG. 1, it will be seen that one embodiment of the cable clamping safety device designated generally by the reference numeral 10 is there shown. The cable clamping safety device includes an elongate generally tubular or cylindrical body member 11 preferably constructed of a suitable metallic material such as steel or the like. The body member is provided with an elongate opening or aperture 12 therein intermediate its ends, as best seen in FIG. 2. A pair of spaced apart substantially parallel projections or plate elements 13 are integrally formed with the body member 11, and project outwardly therefrom. Referring to FIG. 3, it will be noted that the projections 13 actually extend tangentially outwardly from the body member 11, and form boundaries on opposite sides of the aperture 12. It will also be noted that the terminal portions of the body member 11 are flared slightly outwardly to avoid damage to the safety cable to which the safety device 10 is applied.

An elongate substantially flat operator member or lever 14 has one end thereof positioned between the projections 13 and is pivotally connected thereto by means of a pivot 15 to permit limited swinging movement of the operator member relative to the body member. With respect to the pivotal axis of the operator member 14, it is pointed out that the safety device in use is normally applied to a vertically oriented safety cable so that the longitudinal axis of the pivotal body member is also vertically oriented. Thus, the operator member 14 pivots about a substantially horizontal axis relative to the body member 11. This operator member 14 which is preferably constructed of a suitable rigid metallic material, is bent intermediate its ends to define an inner portion 16 and an outer portion 17. It will be seen that the included angle defined between the inner and outer portions 16 and 17 comprises an obtuse angle and that the terminal part of the outer portion 17 is provided with an aperture 18 for receiving the attachment element of a workman's safety belt as illustrated in FIG. 1. It will also be noted that the terminal edge of the outer portion 17 is of curved configuration to define the relatively smooth surface thereat.

Referring again to FIGS. 2 and 3, it will be seen that the terminal part of the inner portion 16 is bifurcated to define a pair of aperture attachment ears 19 which receive therebetween the attachment element 20 of the cable engaging friction shoe or member 21. A pivot 22 pivotally connects the attachment element 20 to the attachment ears 19, so that the friction shoe 21 is pivotal relative to the operator member 14 about a substantially horizontal axis which is substantially parallel to the pivotal axis of the operator member 14.

It will also be noted that the friction shoe which is of substantially elongate narrow and flat configuration presents a substantially flat cable engaging face 23 which is movable through the aperture 12 of the body member 11 for engagement of the safety cable as best seen in FIG. 3. The inner portion 16 of the operator member 14 is also provided with a downwardly opening recess 24 located intermediate its ends in which is positioned an attachment pin 25. A similar pin 26 extends between and is secured to the projections 13 adjacent the respective lower portions thereof, and opposite ends of a helical tension spring 27 are secured to the pins 25 and 26 to urge the operator member 14 in a counter-clockwise direction relative to pivot 25 as seen in FIG. 2. It will be seen that the friction shoe 21 will therefore be constantly urged into engagement with the safety cable C to which the device is applied by action of the tension spring 27.

It will further be noted that the operator member 14 extends generally obliquely upwardly with respect to the vertical as defined by the safety cable C whereby the weight of the operator member through action of gravity and its oblique disposition also tends to urge the operator member about its pivotal axis in a counter-clockwise direction. Therefore, the friction load normally exerted by the friction shoe 21 against the safety cable C is defined by the counter-clockwise moment of the operator member 14. This counter-clockwise moment includes the combined weight moment of the operator member and the spring load exerted by the yieldable spring member 27. Clockwise movement of the operator member beyond the position illustrated in FIG. 2 is prevented by engagement of the upper edge of the inner portion 16 of the operator member with a stop pin 28 that extends between and is secured to the projections 13 adjacent the respective upper portions thereof.

The safety device 10 has been illustrated for use in conjunction with a safety cable C associated with a tower structure T of the type, for example, commonly used for a floodlight or the like. This tower structure will be provided with steps S to aid workmen in climbing the structure. The workman will be provided with a safety belt 30 which is applied to his body in tight fitting relation. This safety belt may be provided with a means for attachment to the operator member of the type described in my Patent 3,006,431. This attachment mechanism is designated generally 31, and a detailed description thereof is thought to be unnecessary for the instant application. This attachment mechanism 31 includes an attachment pin 32 which projects through the aperture 18 in the operator member 14 to permit relative movement therebetween.

In operation, the safety device 10 will be applied to a safety cable C associated with the tower structure T so that the cable extends through the body member 11. The operator member 14 will be secured to the safety belt 30 by means of the attachment mechanism 31, the attachment pin 32 releasably engaging the operator member by means of the aperture 18. The cable clamping safety device 10 clamps the safety cable C in the event that the workman should lose his footing so that all of his weight will be supported by the belt and be transmitted to the operator member by means of the pin 32. This action causes pivoting of the operator member in a counter-clockwise direction, as viewed in FIG. 2, about its pivotal axis 15 which, in turn, causes the friction shoe 21 to be urged into clamping engagement against the safety cable C. The weight of the workman exerted on the outer end of the operative member 14 will also tend to cause the safety device to twist relative to the vertical so that the body member is disaligned with respect to the cable C, as illustrated by dotted line configuration in FIG. 2. Thus, the workman will be prevented from falling as a result of the clamping action of the safety device 10, and since the friction shoe 21 is normally urged into engaging relation with respect to the cable C, this action is instant and precludes any whipping action with respect to the workman.

However, it is also desirable to have the safety device 10 move along the cable C during ascent and descent of the workman with respect to the tower structure T. As the workman climbs the tower structure T, a clockwise force is exerted on the outer end portion 17 of the operator member 14, as viewed in FIG. 2, so that the friction shoe 21 is not increasingly urged into clamping relation with respect to the safety cable C. When the workman descends, it will be seen that substantially no external force is exerted on the operator member and the frictional contact of the friction shoe 21 is actually defined by the yieldable spring force and the weight moment of the operator member 14. It will be noted that in the absence of any force applied to the outer end of the operator member 14, not only does the entire inner wall surface 29 of the body member 11 frictionally engage the cable C, but the friction face 23 of the friction shoe 21 also contacts the safety cable. As pointed out above, the frictional contact is increased by the counter-clockwise moment normally exerted on the operator member 14 in the absence of any external force acting downwardly on the outer end of the operator member.

The coefficient of friction between the cable and the safety appliance 10 is slightly less than the action of gravity exerted on the safety device. Further, the particular construction and the configuration of the operator member 14 in its relation to the body member 11 has its center of gravity so located that the safety device in the absence of any external force exerted on the outer end of the operator member 14 will maintain its vertical alignment with respect to the safety cable C. Thus, the safety device will slide freely downwardly with respect to the safety cable C as the workman descends, and thus obviate the necessity of requiring the workman to manipulate the operator member with his hands or with his body. The safety device 10 is especially adaptable for use with non-metallic safety cables or ropes such as those formed of nylon or other suitable plastic materials, even though the coefficient of friction between the coacting metal parts of the safety device and nylon safety cables is slightly less than the coefficient of friction between the safety device and the metallic cable.

It is pointed out that the particular configuration of the operator member, including the angulated relation of the inner and outer portions and the coaction of the yieldabe spring means therewith, is such that the center of gravity of the entire device is so located that the device does not tend to rotate and the movement of the entire device is substantially vertically translatory with respect to the safety cable in the absence of any external force exerted on the outer end of the operator member.

It will, therefore, be seen that I have provided a new and improved cable clamping safety device which interconnects the workman safety belt to the conventional safety cable and which is freely slidable along a vertically disposed safety cable as a workman climbs and descends a tower structure. It will be noted that the safety device maintains engaging relation by means of a friction shoe and body member with the safety cable, and is operated to prevent a whipping action in the event a workman loses his footing, but is also arranged and constructed so that the coefficient of friction between the safety device and safety cable permits downward sliding movement of the device as the workman descends without necessitating the use of the workman's hands or body to move the safety device.

It will also be seen that the safety device has the special utility with respect to cables constructed of non-metallic material such as nylon or the like. It is further pointed out that the safety device, while being illustrated in conjunction with a workman's safety belt, may also be used in conjunction with other appliances such as harnesses used to suspend workmen, scaffold structures, and other apparatus which are moved vertically with respect to a supporting cable or safety cable.

It will, of course, be understood that various changes may be made in the form, details, arrangement and proportions of the various parts without departing from the scope of my invention.

What is claimed is:

1. A cable clamp safety device comprising
an elongate tubular body member embracing a vertically oriented safety cable and being slidable therealong, said body member having an aperture therein intermediate the ends thereof,
a pair of spaced apart projections integrally formed with said body member and projecting outwardly therefrom,
an elongate operator member having one end positioned between and pivotally connected with said projections for limited vertical swinging movement about a horizontal axis, said operator member projecting upwardly and outwardly from said body member and being bent intermediate its ends to define inner and outer portions having an obtuse included angle therebetween,
said operator member having means adjacent the end of said outer portion for attachment to a safety appliance such as a workman's safety belt,
a cable-engaging shoe positioned within the aperture in said body member and being pivotally connected with the inner end of said inner portion of the operator member and having a friction face which cooperates with said body member for clamping a cable therebetween,
means on said projections for limiting upward swinging movement of said operator member,
yieldable means extending between and interconnected with said operator member and said body member for normally urging said operator member in a downward direction and thereby urging said cable-engaging shoe into engagement with the safety cable.
the coefficient of friction of said device with respect to the safety cable including the weight moment of the operator member and the force of said yieldable means, being slightly less than the magnitude and direction of the force of gravity acting on said device whereby said device will freely slide downwardly with respect to the safety cable at a predetermined rate in the absence of a downwardly directed force exerted on the outer end portion of the operator member.

2. The safety device as defined in claim 1 wherein said friction face of said cable-engaging shoe is of substantially flat configuration.

3. The cable clamp safety device as defined in claim 1 wherein said means for limiting movement of said operator member comprises a pin element extending between and secured to said projections, the upper edge portion of said operator member being spaced slightly from but disposed in very close proximity to said pin element.

4. A cable clamp safety device comprising,
an elongate tubular body member having an inner cylindrical surface embracing and engaging a vertically oriented safety cable and being slidable therealong, said body member having an aperture therein intermediate the ends thereof,
a pair of spaced apart projections integrally formed with said body member and projecting outwardly therefrom,
an elongate operator member having one end positioned between and pivotally connected with said projections for limited vertical swinging movement about a horizontal axis,
said operator member having means adjacent the end of said outer portion for attachment to a safety appliance such as a workman's safety belt,
a cable-engaging shoe positioned within the aperture in said body member and being pivotally connected with the inner end of said inner portion of the operator member and having a substantially flat friction face which cooperates with said body member for clamping a cable therebetween,
means on said projections for limiting upward swinging movement of said operator member,
yieldable means extending between and interconnected with said operator member and said body member for normally urging said operator member in a downward direction and thereby urging said cable-engaging shoe into engagement with the safety cable,
the coefficient of friction of said device with respect to the safety cable including the weight moment of the operator member and the force of said yieldable means, being slightly less than the magnitude and direction of the force of gravity acting on said device whereby said device will freely slide downwardly with respect to the safety cable at a predetermined rate in the absence of a downwardly directed force exerted on the outer end portion of the operator member.

References Cited by the Examiner

UNITED STATES PATENTS

| 804,461 | 11/1905 | Ferris. | |
|---|---|---|---|
| 1,576,210 | 3/1926 | Nickson. | |
| 1,646,336 | 10/1927 | Alfano | 24—134 |
| 2,900,690 | 8/1959 | Suernram | 24—134 |
| 3,006,431 | 10/1961 | Meyer | 182—5 |

FOREIGN PATENTS

| 660,373 | 4/1963 | Canada. |
|---|---|---|
| 607,710 | 9/1948 | Great Britain. |

BERNARD A. GELAK, *Primary Examiner.*